(12) United States Patent
Guim Bernat et al.

(10) Patent No.: US 10,992,556 B2
(45) Date of Patent: Apr. 27, 2021

(54) DISAGGREGATED RESOURCE MONITORING

(71) Applicant: Intel Corporation, Santa Clara, CA (US)

(72) Inventors: Francesc Guim Bernat, Barcelona (ES); Karthik Kumar, Chandler, AZ (US); Susanne M. Balle, Hudson, NH (US); Daniel Rivas Barragan, Cologne (DE); Rahul Khanna, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 812 days.

(21) Appl. No.: 15/613,944

(22) Filed: Jun. 5, 2017

(65) Prior Publication Data
US 2018/0351836 A1 Dec. 6, 2018

(51) Int. Cl.
| H04L 12/26 | (2006.01) |
| H04L 29/08 | (2006.01) |
| H04L 12/70 | (2013.01) |
| G06F 16/9535 | (2019.01) |

(52) U.S. Cl.
CPC ............. *H04L 43/06* (2013.01); *H04L 43/08* (2013.01); *H04L 67/025* (2013.01); *G06F 16/9535* (2019.01); *H04L 2012/5636* (2013.01)

(58) Field of Classification Search
None
See application file for complete search history.

(56) References Cited

U.S. PATENT DOCUMENTS

| 2014/0026111 A1* | 1/2014 | Stitt | G06F 17/17 717/101 |
| 2016/0378629 A1* | 12/2016 | Gwozdz | G06F 11/3476 702/186 |
| 2018/0145923 A1* | 5/2018 | Chen | G06F 9/5077 |

\* cited by examiner

*Primary Examiner* — Cai Y Chen
(74) *Attorney, Agent, or Firm* — Patent Capital Group (57) ABSTRACT

Particular embodiments described herein provide for a network element that can be configured to receive a request related to one or more disaggregated resources, link the one or more disaggregated resources to a local counter, receive performance related data from each of the one or more disaggregated resources, and store the performance related data in the local counter. In an example, the one or more disaggregated resources comprise a software defined infrastructure composite node

25 Claims, 7 Drawing Sheets

DISAGGREGATED RESOURCE MONITORING

TECHNICAL FIELD

This disclosure relates in general to the field of computing and/or networking, and more particularly, to disaggregated resource monitoring.

BACKGROUND

Some current networks, especially data centers, have a relatively static computing infrastructure. There are set number of servers, each having a set number of computer processing units (CPU) and a fixed amount of memory. The number of servers, CPUs, and fixed memory is enough to cover peak demand. However, this leaves many servers under-utilized during non-peak conditions. One current trend is to disaggregate resources or separating data-center equipment, in particular servers, into separate resource components.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION

Example Embodiments

The following detailed description sets forth examples of apparatuses, methods, and systems relating to a system for enabling disaggregated resource monitoring. Features such as structure(s), function(s), and/or characteristic(s), for example, are described with reference to one embodiment as a matter of convenience; various embodiments may be implemented with any suitable one or more of the described features.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

Figure 1:
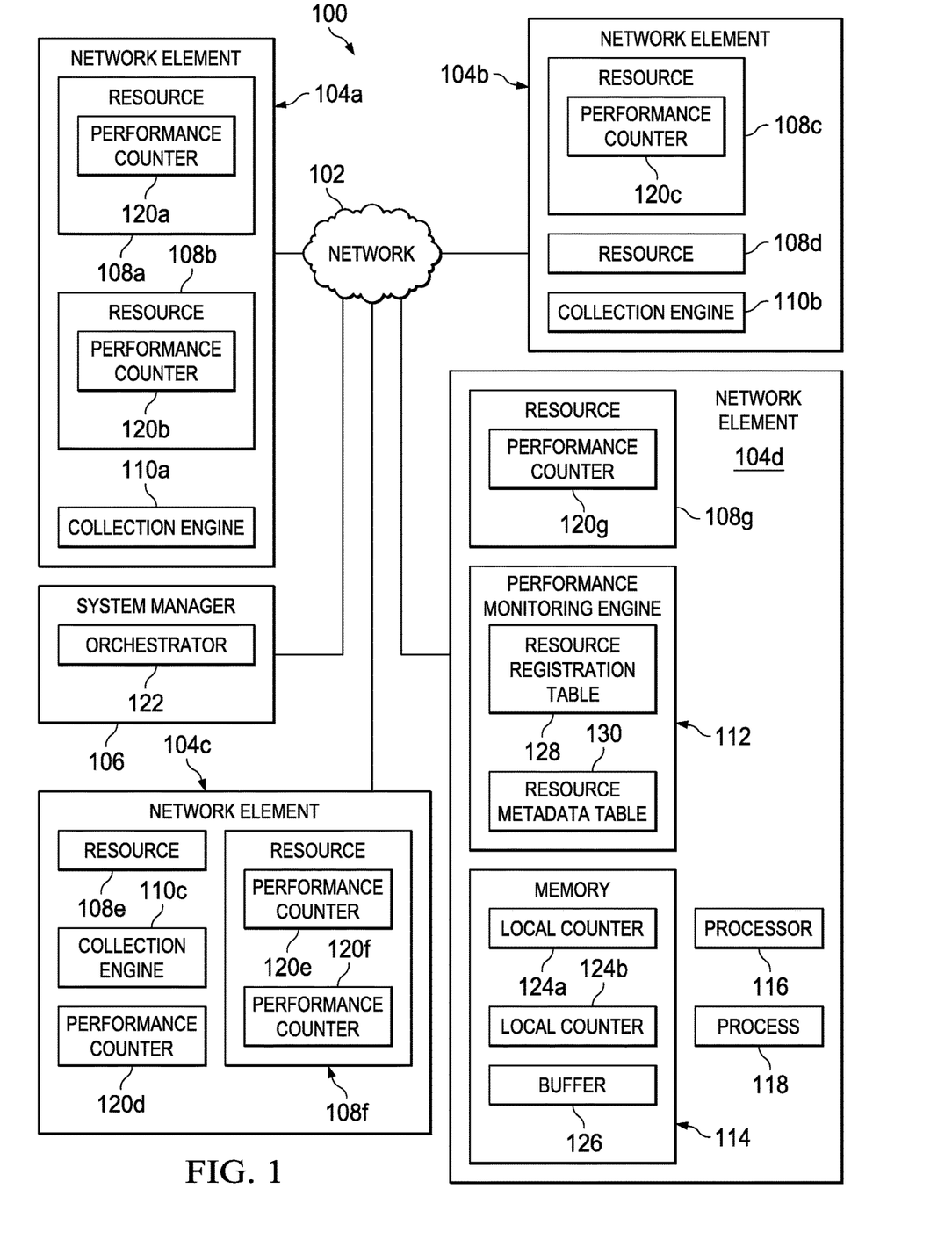
FIG. 1 is a simplified block diagram of a system for disaggregated resource monitoring, in accordance with an embodiment of the present disclosure.

FIG. 1 is a simplified block diagram of a system 100 (e.g., data center) to enable disaggregated resource monitoring, in accordance with an embodiment of the present disclosure. System 100 can include one or more network elements 104a-104d and a system manager 106. Network element 104a can include one or more resources 108a and 108b and a collection engine 110a. Resource 108a can include performance counter 120a. Resource 108b can include performance counter 120b. Network element 104b can include one or more resources 108c and 108d, and a collection engine 110b. Resource 108c can include a performance counter 120c. Network element 104c can include one or more resources 108e and 108f, a collection engine 110c, and a performance counter 120d. Resource 108f can include one or more performance counters 120e and 120f. Performance counter 120d can be associated with resource 108e. Network element 104d can include a resource 108g, a performance monitoring engine 112, memory 114, a processor 116, and a process 118. Resource 108g can include a performance counter 120g. Performance monitoring engine 112 can include a resource registration table 128 and a resource metadata table 130. Memory 114 can include one or more local counters 124a and 124b and a buffer 126. System manager 106 can include an orchestrator 122. Orchestrator 122 can be configured to group (e.g., into a composite node) the disaggregated resources that will be used during execution of process 118. Process 118 can be a process or application. In an example, system manager 106 is a software defined infrastructure (SDI) manager. Network elements 104a-104d and a system manager 106 may be in communication with each other using network 102.

It is to be understood that other embodiments may be utilized and structural changes may be made without departing from the scope of the present disclosure. Substantial flexibility is provided by system 100 in that any suitable arrangements and configuration may be provided without departing from the teachings of the present disclosure. For example, each of network elements 104a-104d can include one or more resources and processes. Also, each of the one or more resources can include one or more counters.

Each of network elements 104a-104c and resources 108a-108f can be or include a disaggregated resource. Disaggregated resources are a change in direction of data center architecture away from hyper-converged servers where computer, network, memory and storage resources are all assembled in one unit (e.g., a server) to a disaggregated approach where memory, storage and accelerators are pooled together in sleds and then assembled as needed by an orchestrator (e.g., orchestrator 122) to build a virtual node that has the necessary resources to run a particular workload or process (e.g., process 118). The term "resource" includes an accelerator (e.g., FPGA), remote memory (3D Cross point memory), storage (SSDs), system, electronic device, cloud service, processor, core of a multi-core processor, virtual machine, operating system services, processes, daemons, etc. that may be used by a process or application. The term "disaggregated resource" means a resource that is separate from the device that is running or executing the process or application or a device or machine that has been separated into components. For example, resource 108a in network element 104a may be memory that is used during execution of process 118 and resource 108c in network element 104b may perform or be responsible for some processing during the execution of process 118.

Each of network elements 104a-104d can be a chassis that includes or holds a disaggregated resource. In some disaggregated systems, one or more of network elements 104a-104c could be an accelerator sled that comprises FPGA resources and a collection engine, without more. In an example, each of network elements 104a-104d can be a sled comprising resources of a specific type (e.g., an accelerator sled comprising FPGAs, a memory sled comprising 3D XP modules, or a storage sled comprising SSDs). In an example, each local counter 124a and 124b can be a counter in a specific region of memory 114 that has been allocated for process 118 by network element 104d. If each local counter 124a and 124b are a specific region of memory 114, each local counter 124a and 124b can be accessed using current or traditional read writes to the specific memory ranges that include local counter 124a and 124b. In another example, each local counter 124a and 124b may be a model specific register (MSR) and can be accessed using current procedures to access MSRs. Each local counter 124a and 124b is a natively exposed counter that is local to the device (e.g., network element 104a) that is running process 118.

System 100 can be configured to allow for the creation of local counters 124a and 124b (e.g., virtual performance counters) in network element 104d to expose data from disaggregated resources (e.g., resource 108a, performance counter 120d, etc.) that are not natively exposed by performance counters local to network element 104d (e.g., performance counter 120g is not natively exposed to network element 104d). Network element 104d can be configured to execute process 118 (or an application), acquire data (e.g., counter or resource data) from a disaggregated resource (e.g., resource 108b or network element 104a) and store the data in local counters 124a and 124b for use by process 118. Local counters 124a and 124b are native to network element 104d, unlike performance counter 120a that is not native to network element 104d. Using local counters 124a and 124b, existing techniques or current standard practices can be used to monitor or access the data from the disaggregated resources without a material change in their implementations. For example, if each local counter 124a and 124b are a specific region of memory 114, each local counter 124a and 124b can be accessed using current or traditional read writes to the specific memory ranges that include local counter 124a and 124b, if each local counter 124a and 124b is a MSR, each local counter 124a and 124b can be accessed using current procedures to access MSRs, etc. This can be a critical feature in networks where thousands of existing natively exposed counters and counter stacks have been already implemented (e.g., cloud based systems, network functions virtualization (NFV), virtual network function (VNF), etc.).

More specifically, performance monitoring engine 112 can be configured to associate or register one or more disaggregated resources to local counter 124a and/or local counter 124b where process 118 can access the performance counter data from each of the disaggregated resources. The data from each of the disaggregated resources can be provided during run time of process 118. After registration of a disaggregated resource (e.g., resource 108a) or counter (e.g., performance counter 120a), performance monitoring engine 112 can periodically fetch or receive data (e.g., performance related data) that the disaggregated resource or counter has acquired or generated. The received data can be stored in local counter 124a and 124b and accessed by process 118. In an example, the received data can be used to created derived performance metrics from multiple disaggregated resources and the derived performance metrics can be stored in local counters 124a and 124b. The access to local counter 124a and 124b by process 118 allows process 118 to access and use the data that the disaggregated resource or counter has acquired as if the disaggregated resource or counter was a part of network element 104d (e.g., native to network element 104d) or directly attached to a local platform that includes network element 104d and is executing process 118.

Elements of FIG. 1 may be coupled to one another through one or more interfaces employing any suitable connections (wired or wireless), which provide viable pathways for network (e.g., network 102, etc.) communications. Additionally, any one or more of these elements of FIG. 1 may be combined or removed from the architecture based on particular configuration needs. System 100 may include a configuration capable of transmission control protocol/Internet protocol (TCP/IP) communications for the transmission or reception of packets in a network. System 100 may also operate in conjunction with a user datagram protocol/IP (UDP/IP) or any other suitable protocol where appropriate and based on particular needs.

Turning to the infrastructure of FIG. 1, system 100 in accordance with an example embodiment is shown. Generally, system 100 may be implemented in any type or topology of networks. Network 102 represents a series of points or nodes of interconnected communication paths for receiving and transmitting packets of information that propagate through system 100. Network 102 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In system 100, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Messages through the network could be made in accordance with various network protocols, (e.g., Ethernet, Infiniband, OmniPath, etc.). Additionally, radio signal communications over a cellular network may also be provided in system 100. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. The data may help determine a status of a network element or network. The term "status" is to include a state, condition, level of operation of a resource, congestion of the network, data related to traffic or flow patterns of the network, or another type of data or information that helps to determine the performance, state, condition, etc. of the network and/or a resource, either overall or related to one or more network elements. Additionally, messages, requests, responses, and queries are forms of network traffic, and therefore, may comprise packets, frames, signals, data, etc.

In an example implementation, network elements 104a-104d, are meant to encompass network elements, network appliances, servers, routers, switches, gateways, bridges, load balancers, processors, modules, or any other suitable device, component, element, or object operable to exchange information in a network environment. Network elements 104a-104d may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information. Each of network elements 104a-104d and system manager 106 may be virtual or include virtual elements.

In regards to the internal structure associated with system 100, each of network elements 104a-104d and system manager 106 can include memory elements for storing information to be used in the operations outlined herein. Each of network elements 104a-104d and system manager 106 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in system 100 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, elements of system 100, such as network elements 104a-104d and system manager 106 may include software modules (e.g., collection engines 110a-110c, performance monitoring engine 112, etc.) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of network elements 104a-104d and system manager 106 may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read-only memory (EPROM), an electrically erasable programmable read-only memory (EEPROM)) or an ASIC that includes digital logic, software, code, electronic instructions, or any suitable combination thereof. Any of the potential processing elements, modules, and machines described herein should be construed as being encompassed within the broad term 'processor.'

Figure 2:
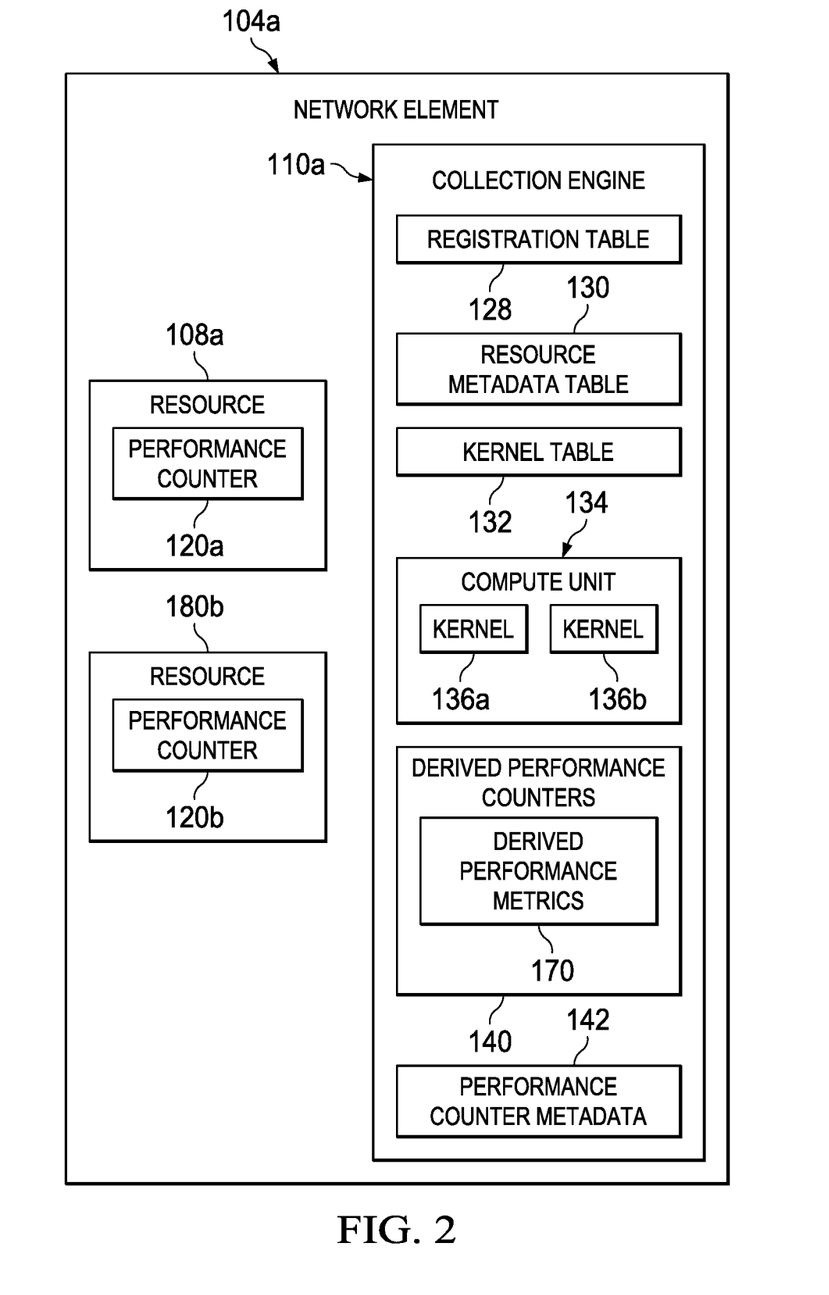
FIG. 2 is a simplified block diagram of a portion of a system for disaggregated resource monitoring, in accordance with an embodiment of the present disclosure.

Turning to FIG. 2, FIG. 2 is a simplified block diagram of an example of network element 104a for use in system 100, in accordance with an embodiment of the present disclosure. Network element 104a can include resources 108a and 108b and collection engine 110a. Resources 108a can include performance counter 120a. Resource 108b can include performance counter 120b.

Collection engine 110a can include a resource registration table 128, a resource metadata table 130, a kernel table 132, a compute unit 134, one or more derived performance counters 140, and performance counter metadata 142. Compute unit 134 can include one or more kernels 136a and 136b. In a specific example, compute unit 134 may be a processor, processing unit, programmable logic device (PLD), custom ASIC, field programable gate array (FPGA), or some other compute unit. Derived performance counters 140 can include derived performance metrics 170.

Kernels 136a and 136b can each be registered either by the provider or owner of network element 104a (resource provider), the owner of system 100 (e.g., a data center manager), or by a composite node owner. Each kernel 136a and 136b can be a bit-stream for a FPGA, binary for x86 or accelerator, Perl data language (PDL), etc. and can be registered to a resource. Kernels 136a and 136b can access local performance and telemetry data (e.g., native metrics) in network element 104a and generate derived performance metrics 170 (e.g., edge analytics). For example, if the disaggregated resource is remote memory, local performance and telemetry data could include memory bandwidth, power, etc. and derived performance metrics generated by kernel 136a or 136b could include bandwidth/cost/watt. The derived performance metrics can be stored in derived performance counters 140 for use by performance monitoring engine 112. Performance counter metadata 142 can to be used to store information about each of kernels 136a and 136b and resources 108a and/or 108b. Performance counter metadata 142 can link a resource and/or counter to a kernel to be accessed by compute unit 134 to discover what the kernel computes and the type of data the kernel generates.

Once process 118 starts running on network element 104d, process 118 can use existing performance counter techniques to register to local counters 124a and 124b. In an example, process 118 can also specify a memory range in memory 114 to expose more resources. Using resource registration table 128, performance monitoring engine 112 can associate or register local counters 124a and 124b to network element 104a (or another network element). Derived performance counters 140 can provide data from performance counters 120a and 120b to performance monitoring engine 112 as the data is generated. Local counters 124a and 124b can be associated or registered and disassociated or de-registered to network element 104a (or another network element), resources 108a and 108b (or other resources), and/or performance counters 120a and 120b (or other performance counters). Kernels 136a and 136b can be used to compute derived performance metrics using data from performance counters 120a and 120b. In an example, performance monitoring engine 112 can be configured to reserve system kernels, create a reserved area for kernels to be built and used by a disaggregated resource manufacturer, or enable user based devoted kernels.

In a specific illustrative example, system 100 can be configured to receive a request (e.g., status request, performance request, state request, etc.) related to one or more disaggregated resources, link the one or more disaggregated resources to a local counter (e.g., local counter 124a), receive performance related data (e.g., derived performance metrics) from each of the one or more disaggregated resources, and store the performance related data in the local counter. The performance related data may have been created using compute unit 134. In an example, the received performance related data is based on counter data that was not natively exposed by the local counter and the received performance related data can be accessed using MSR. In an example, the one or more disaggregated resources comprise a software defined infrastructure composite node. The performance data can be related to process 118 and process 118 can access the performance related data in the local counter. In addition, one or more of network elements 104a-104c and/or resources 108a-108g may be a virtual machine.

For purposes of illustrating certain example techniques of system 100, it is important to understand the communications that may be traversing the network environment. The following foundational information may be viewed as a basis from which the present disclosure may be properly explained.

Some data centers use a SDI to serve a dynamic and unpredictable environment where a network manager is tasked with maintaining control of strategic assets while delivering cloud capabilities across an enterprise. An SDI is a computing infrastructure under the control of virtual machines, operates independent of any hardware-specific dependencies, and is programmatically extensible. The SDI can be configured to define application requirements from the infrastructure (both functional and non-functional requirements) and have physical implementations of the hardware configured to deliver those application requirements. Typical deployments require a software defined network (SDN) and cloud capabilities as a minimal point of entry into the SDI. Transition from one configuration to another can be achieved without downtime, or very little downtime, by automatically calculating the set of state changes between one configuration and another and an automated transition between each step.

In SDI, processes can be hosted at the top of a composite node assembled using disaggregated resources. These disaggregated resources are distributed across the network and can be virtualized to the applications. Because the resources are pooled from different parts of the network, control and monitoring of the resources can be difficult. Current techniques expose disaggregated resource monitoring through various monitoring entities (e.g., OpenStack, Ceilometer, Monasca, ganglia, etc.). These types of monitoring approaches require applications (such as operating systems or applications) to interact with the third-party software in order to gather information. Even though these tools are powerful for data center monitoring and can be used by datacenter based software stack applications (e.g., system orchestrators or resource managers), they are not suitable to be used by a process or application. By definition, SDI taxonomy creates dynamically composite nodes that abstract from applications and operating systems running on them. Because the resources are disaggregated over the data center, the disaggregated nature of resource data collection may be counter-intuitive to existing tools as it defeats the idea of hiding the distributed nature of the resource itself.

In addition, an aspect of disaggregated resource monitoring is to provide timely and relevant data for analyzing resource utilization. For monitoring efficiency, it can be important that the resource analysis is backed up with derived features (e.g., derived performance metrics) that can simplify the knowledge consumption and application while reducing the data traffic through the network or fabric. What is needed is a system, method, and apparatus that can be configured to expose resources and counters of disaggregated resources to describe the characteristics of each of the disaggregated resources. It would also be beneficial if the system, method, and apparatus could handoff received counter data from the disaggregated resources to a set of predefined, native, or local counters that are exposed to the application layer where an application can access the counters (when needed) using a set of MSRs.

A system for disaggregated resource monitoring, as outlined in FIG. 1 and FIG. 2, can resolve these issues (and others). System 100 may be configured to expose resources (e.g., resources 108a-108f) and counters (e.g., performance counters 120a-120f) of network elements along with metadata (e.g., performance counter metadata 142) to describe the characteristics (e.g., type of data, information exposed, when the data is exposed, etc.) of each resource and/or counters (e.g., the disaggregated resources). In addition, system 100 can be configured to handoff the data received from each resource and/or counter to a set of predefined native local counters (e.g., local counters 124*a* and 124*b*) that are exposed to the application layer where process 118 can access the local counters that include the data from the resources and/or counters (when needed) using a set of MSRs. The term "MSR" includes any of various control registers in an x86 instruction set used for debugging, program execution tracing, computer performance monitoring, toggling certain CPU features, etc.

Kernels 136*a* and 136*b* are executed by compute unit 134 to allow network element 104*a* to generate derived performance metrics from resources 108*a* and 108*b* and performance counters 120*a* and 120*b* as well as generate telemetry data based on complex operations on many different samples and counters. In an example, system 100 can allow disaggregated resources to register to a compute unit (e.g., compute unit 134) local to the disaggregated resource itself or in a controller located within a rack as set of kernels that compute derived performance metrics. System 100 can be configured for different resources and providers.

In an example, resources (e.g., resource 108*a*) and/or counters (e.g., performance counter 120*a*) can be exposed to a manager (e.g., performance monitoring engine 112) once a composite node assembly is complete or during run-time of process 118. When the local counters (e.g., local counters 124*a* and 124*b*) are associated with the resources and/or counters, the local counters can be monitored by performance monitoring engine 112. After a registration, performance monitoring engine 112 can periodically (or based on a counter definition) fetch data required or requested by process 118 or the data in the local counters can be accessed using MSR. A collection engine (e.g., collection engine 110*a*) can be extended with compute unit 134 and the collection engine can use kernels 136*a* and 136*b* to synthesize derived performance metrics. Kernels 136*a* and 136*b* can be registered either by a resource provider, by a network administrator, or by a composite node administrator. Local performance and telemetry data from the resources and/or counters can be used by kernels 136*a* and 136*b* to generate derived performance metrics that can be communicated to performance monitoring engine 112 and stored in local counters 124*a* and 124*b*.

While a software based solution could be created, performance counters, by definition, need to be provided in real-time to the applications. Using software based solutions to expose this information to the applications may result in delays significant enough that the counters have been already changed to a new state. Providing timely information with the minimum possible time is crucial in several data center scenarios involving real-time action, responses, quality-of-service (QoS), service licensing agreements (SLAs), etc. It is important to note that the corrective action may be applied to a subset of disaggregated resources (e.g., work may be migrated from one disk array to another due to overall SLAs not being met as a result of a global disk bottleneck) so it is important to monitor the disaggregated resources at the individual resource level.

In a specific example, system 100 can be configured to provide monitoring data center capability that can be used in SDI composite nodes to transparently and timely expose performance counters from the different disaggregated resources composing the node. Each of the disaggregated resources, or their controllers within a rack, can include one or more compute units 134 that expose resource monitoring counters to a compute sled once a composite node assembly is complete (or dynamically during the run-time). An existing compute sled can be extended with performance monitoring engine 112 that manages local counters 124*a* and 124*b* that can be registered to one or more disaggregated resources. When a registration happens, the compute sled is responsible to fetch periodically (or based on the counter definition) the performance counters in the disaggregated resources that are required by process 118. Process 118 accesses the performance counters using existing monitoring platform capabilities. Each of the disaggregated resources (e.g., resources 108*a*-108*f*), a network element that includes a disaggregated resource (e.g., network element 104*a* that includes disaggregated resources 108*a* and 108*b*), or their controller within a rack, include a collection engine (e.g., collection engine 110*a*) that includes a compute unit 134 that can access or hold a set of kernels (e.g., kernels 136*a* and/or 136*b*) that are used to synthesize derived performance metrics and store the derived performance metrics in derived performance counters 140. The kernels can be registered either by the resource provider, by the data center owner, or by the composite node owner. Each kernel can access local performance and telemetry data in the disaggregated resource.

Figure 3:
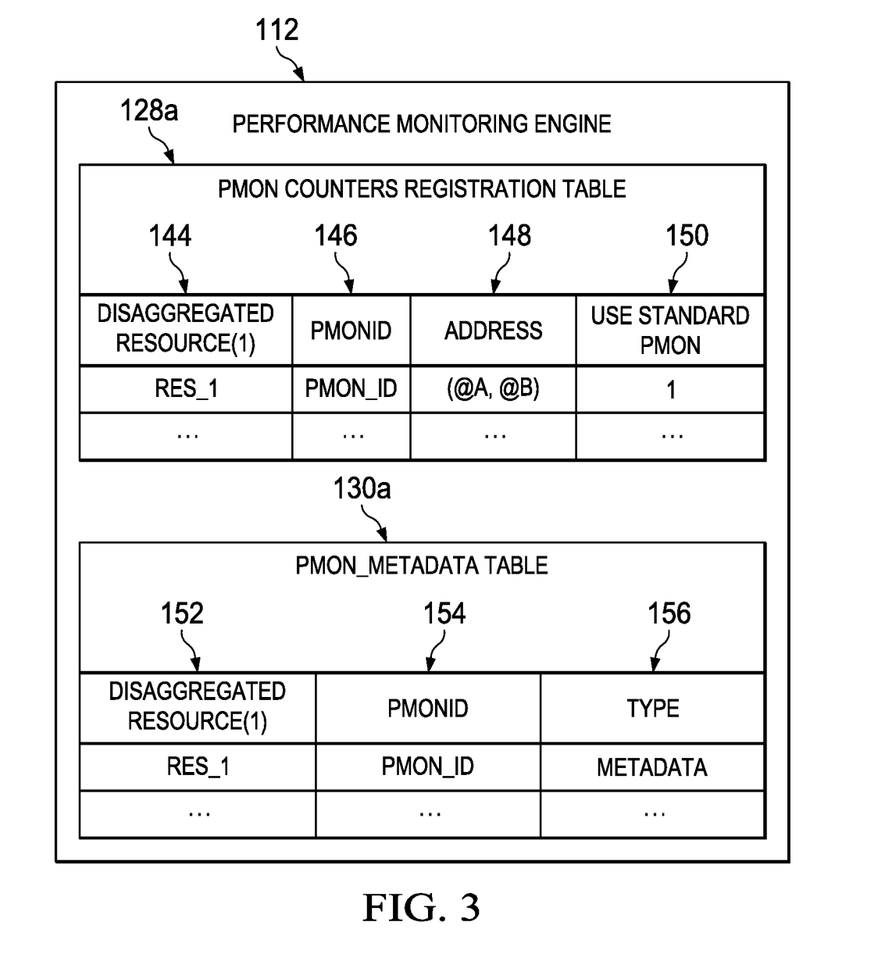
FIG. 3 is a simplified block diagram of a portion of a system for disaggregated resource monitoring, in accordance with an embodiment of the present disclosure.

Turning to FIG. 3, FIG. 3 is a simplified block diagram of an example of performance monitoring engine 112 for use in system 100, in accordance with an embodiment of the present disclosure. In a specific example, performance monitoring engine 112 can include a process monitor (PMON) counters registration table 128*a* and a PMON_Metadata table 130*a*. PMON counters registration table 128*a* can include a disaggregated resource column 144, a PMON ID column 146, an address column 148, and a use standard PMON indicator column 150. Disaggregated resource column 144 can include a name for a disaggregated resource. PMON ID column 146 can include an identification of counters included in the disaggregated resource. Address column 148 can include an address (e.g., network address) for the disaggregated resource. Use standard PMON indicator column 150 can include an indicator as to whether or not the disaggregated resource uses standard PMON rules and procedures.

PMON_Metadata table 130*a* can include a disaggregated resource column 152, a PMON ID column 154, and a type column 156. Disaggregated resource column 152 can be similar to disaggregated resource column 144 and include a name for a disaggregated resource. PMON ID column 154 can be similar to PMON ID column 146 and include an identification of counters included in the disaggregated resource. Type column 156 can indicate a type of data that is produced by the counters in the disaggregated resource.

Figure 4:
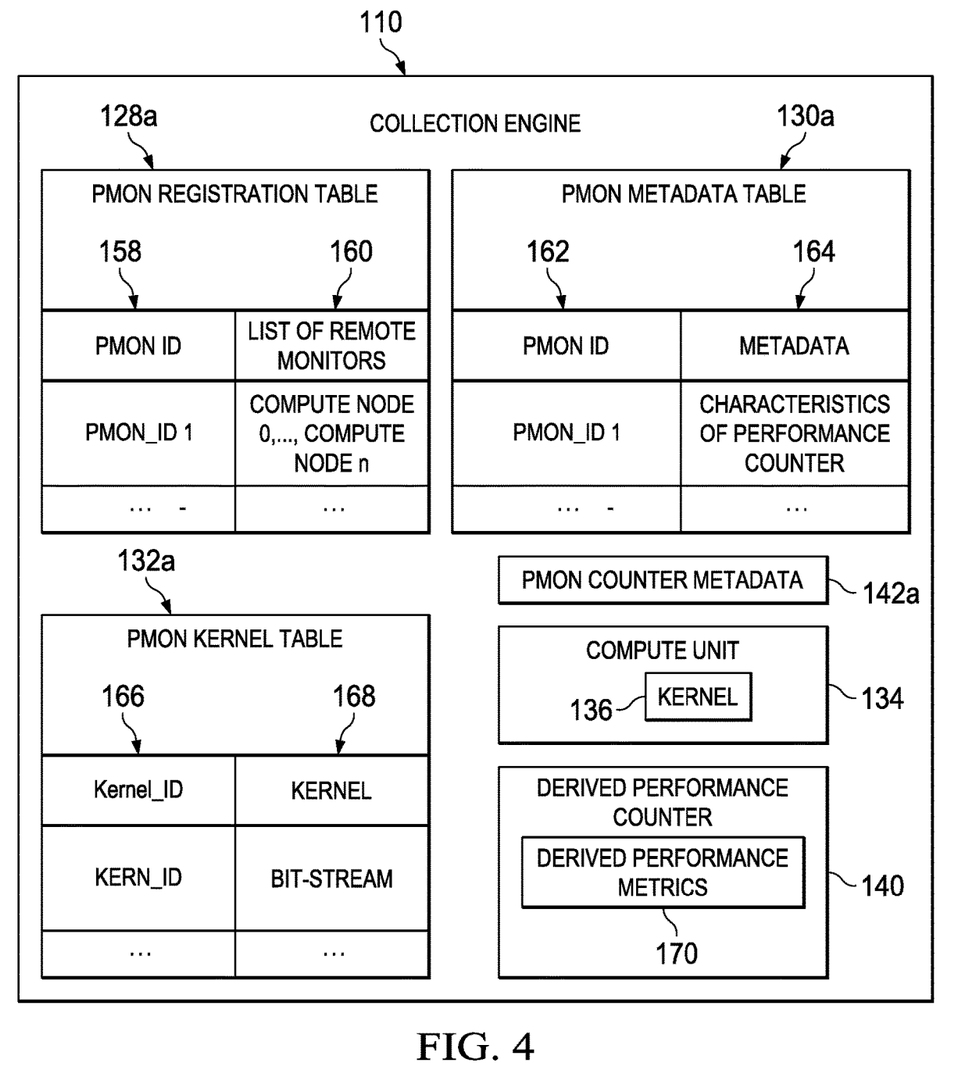
FIG. 4 is a simplified block diagram of a portion of a system for disaggregated resource monitoring, in accordance with an embodiment of the present disclosure.

Turning to FIG. 4, FIG. 4 is a simplified block diagram of an example of collection engine 110 for use in a system 100, in accordance with an embodiment of the present disclosure. In a specific example, collection engine 110 can include a PMON registration table 128*a*, a PMON metadata table 130*a*, a PMON kernel table 132*a*, compute unit 134, derived performance counter 140, and PMON counter metadata 142*a*. PMON registration table 128*a* can include a PMON ID column 158 and a list of remote monitors column 160. PMON ID column 158 can include an identification of a PMON counter. In an example, the identification of a PMON counter in PMON ID column 158 may be a universally unique identifier and/or a PMON_ID. List of remote monitors column 160 can include remote PMON monitors or PMON counters that are associated with the PMON counter identified in PMON ID column 158.

Figure 5:
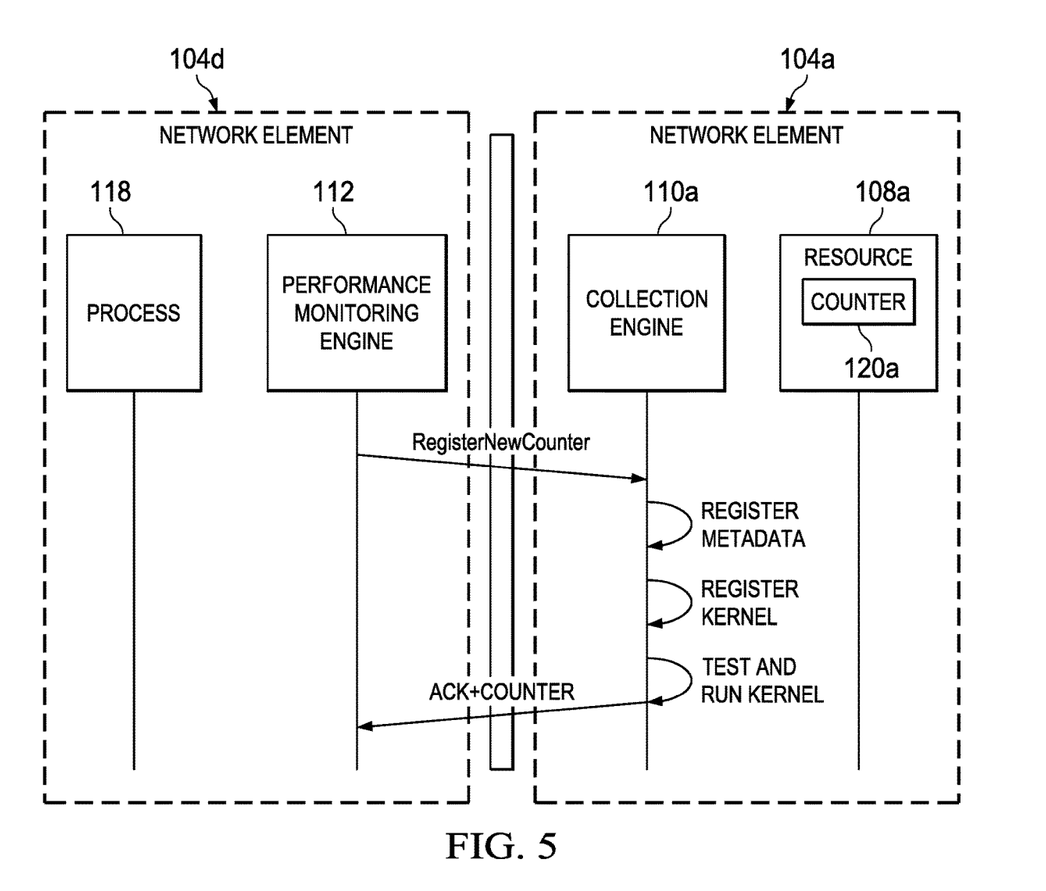
FIG. 5 is a simplified timing diagram illustrating potential operations that may be associated with the system in accordance with an embodiment.

PMON metadata table 130a can include a PMON ID column 162 and a metadata column 164. PMON ID column 162 can be similar to PMON ID column 158 and include an identification of a counter. Metadata column 164 can include metadata (e.g., type of data, information exposed, when the data is exposed, etc.) associated with the counter identified in PMON ID column 158 and information about each of the kernels and resources associated with the counter identified in PMON ID column 158. The meta-data in metadata column 164 can be accessed by compute unit 134 to discover what a specific kernel computes and the type of data the specific kernel generates (e.g., Kernels_Perf_per_Power, Resource=Memory, Meta-data={Type=ulong, Interval=Compute every 10ms, Description="Perf per watt", . . . etc.}). PMON kernel table 132a can include a kernel_ID column 166 and a kernel column 168. Kernel_ID column 166 can include an identification of a kernel (e.g., kernel 136). Kernel column 168 can include information related to a bit-stream that will be executed or is executed by compute unit 134 to compute a particular derived performance metric. In some examples, one or more kernels may not be executed all the time and kernel column 168 can be seen as the storage where the binaries to be executed are stored Turning to FIG. 5, FIG. 5 is a simplified block diagram of a portion of system 100, in accordance with an embodiment of the present disclosure. In an example, performance monitoring engine 112 can send a register new counter message to collection engine 110a. Collection engine 110a can register metadata from performance counter 120a in resource 108a and a kernel associated with performance counter 120a. For example, the metadata may be similar to performance counter metadata 142 illustrated in FIG. 2. Also, the kernel may be similar to kernel 136a and/or 136b also illustrated in FIG. 2. In an example, a test and run of the kernel can be performed to ensure it is functioning properly. Collection engine 110a can send an acknowledgement of the counter identification back to performance monitoring engine 112.

Figure 6:
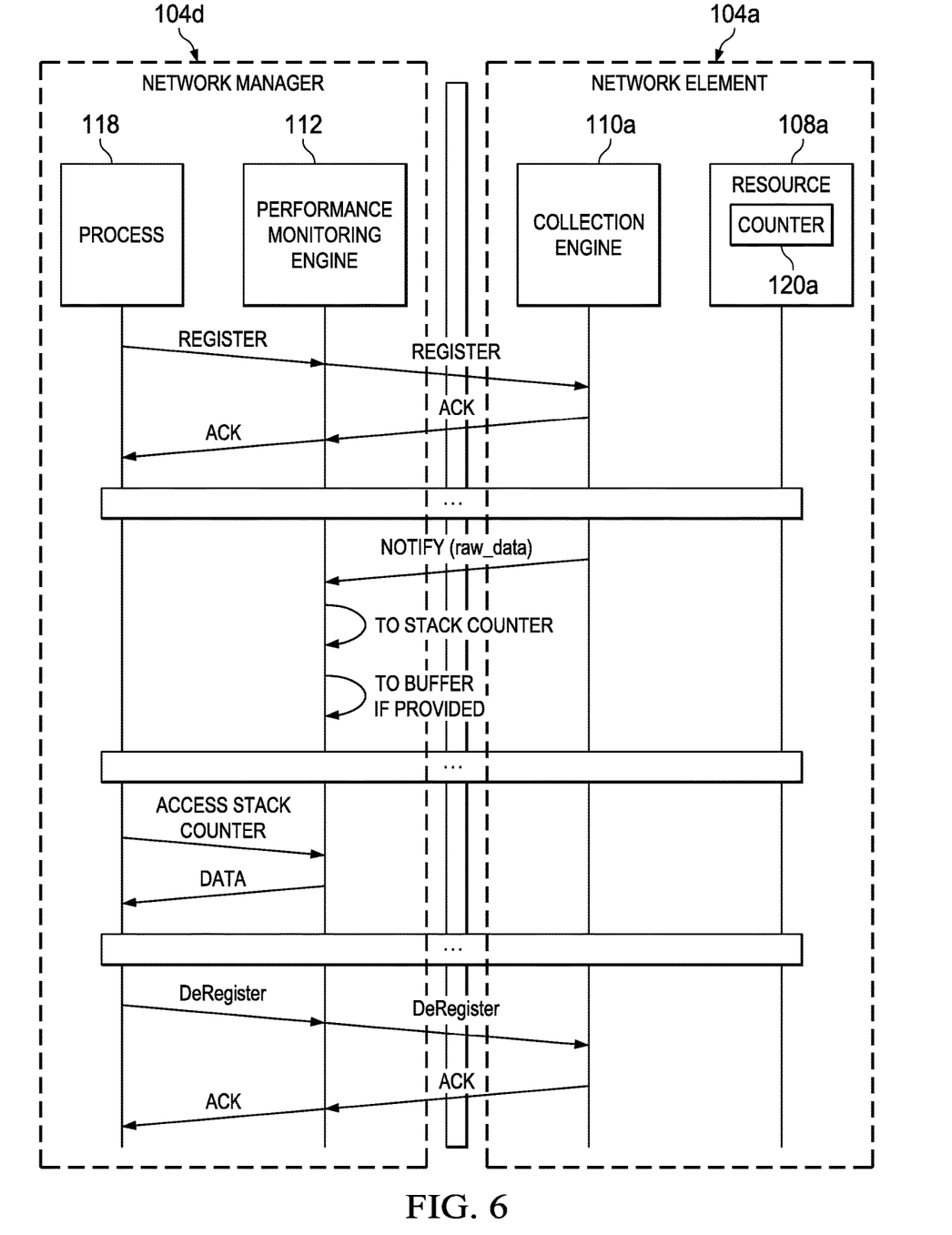
FIG. 6 is a simplified timing diagram illustrating potential operations that may be associated with the system in accordance with an embodiment.

Turning to FIG. 6, FIG. 6 is an example timing diagram illustrating possible operations that may be associated with system 100, in accordance with an embodiment. In an example, process 118 can send a register request (e.g., a register PMON request or some other type of request) to performance monitoring engine 112. Performance monitoring engine 112 can use orchestrator 122 to determine where to send the request. In this example, the request is sent to network element 104a. The request is forwarded to collection engine 110a in network element 104a. Collection engine 110a can register resource 108a and/or counter 120a and send performance monitoring engine 112 a response to the request with an acknowledgement message. Performance monitoring engine 112 can forward the acknowledgement message to process 118. During data collection, collection engine 110a can take collected data from resource 108a, and/or performance counter 120a and send the data to performance monitoring engine 112. Performance monitoring engine 112 can receive the data and store the data in a stack counter (e.g., local counter 124b). Performance monitoring engine 112 can also store the data in a buffer (e.g., buffer 126) if one is available and to be used during execution of process 118. Process 118 can access the data during the runtime of process 118. Using performance monitoring engine 112, process 118 can send a deregister request to network element 104a. In response, collection engine 110a in network element 104a can deregister resource 108a and/or counter 120a and respond with an acknowledgement message.

Figure 7:
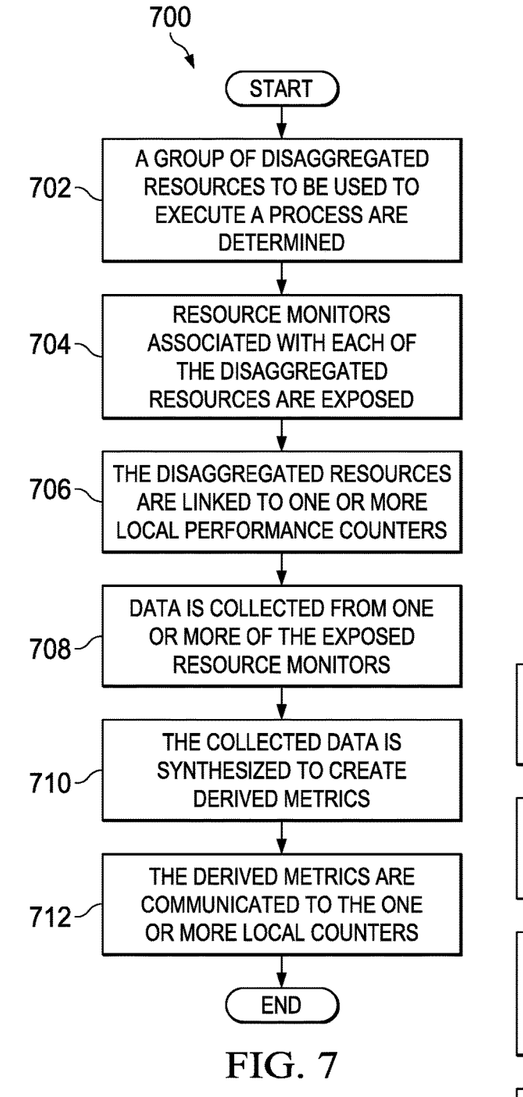
FIG. 7 is a simplified flowchart illustrating potential operations that may be associated with the system in accordance with an embodiment.

Turning to FIG. 7, FIG. 7 is an example flowchart illustrating possible operations of a flow 700 that may be associated with disaggregated resource monitoring, in accordance with an embodiment. In an embodiment, one or more operations of flow 700 may be performed by collection engine 110 and performance monitoring engine 112. At 702, a group of disaggregated resources to be used to execute a process 118 are determined. For example, it may be determined that resources 108a and 108b are to be used to execute process 118. At 704, resource monitors associated with each of the disaggregated resources are exposed. For example, collection engine 110a may register metadata and one or more kernels to resource 108a and/or counter 120a in network element 104a. At 706, the disaggregated resources are linked to one or more local performance counters. For example, resources 108a-108b (e.g., the disaggregated resources) that include performance counters 120a and 120b may be registered to local counter 124a. At 708, data is collected from one or more of the exposed resource monitors. At 710, the collected data is synthesized to create derived performance metrics for the group of resources. For example, the data collected from each of performance counters 120a and 120b may be synthesized by compute unit 134 to create derived performance metrics 170. At 712, the derived metrics are communicated to the one or more local counters.

Figure 8:
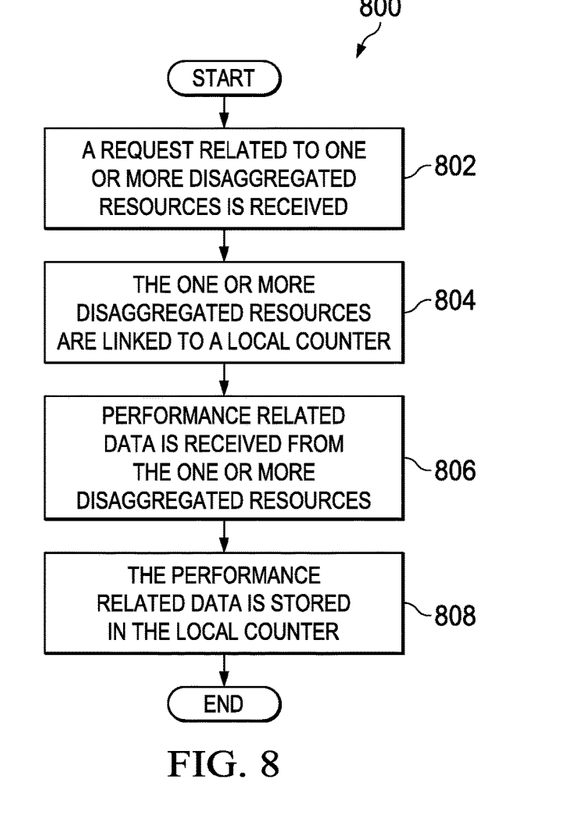
FIG. 8 is a simplified flowchart illustrating potential operations that may be associated with the system in accordance with an embodiment.

Turning to FIG. 8, FIG. 8 is an example flowchart illustrating possible operations of a flow 800 that may be associated with disaggregated resource monitoring, in accordance with an embodiment. In an embodiment, one or more operations of flow 800 may be performed by collection engine 110 and performance monitoring engine 112. At 802, a request related to more of more disaggregated resources is received. For example, the request may be to access performance counters in the disaggregated resources for use by process 118. At 804, the one or more disaggregated resources are linked to a local counter. At 806, performance related data is received from the one or more disaggregated resources. At 808, the performance related data is stored in the local counter.

It is also important to note that the operations in the preceding flow diagrams (i.e., FIGS. 7 and 8) illustrate only some of the possible correlating scenarios and patterns that may be executed by, or within, system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although system 100 have been illustrated with reference to particular elements and operations that facilitate the communication process, these elements and operations may be replaced by any suitable architecture, protocols, and/or processes that achieve the intended functionality of system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES AND EXAMPLES

Example C1 is at least one machine readable storage medium having one or more instructions that when executed by at least one processor, cause the at least one processor to receive a request related to one or more disaggregated resources, a link the one or more disaggregated resources to a local counter, receive performance related data from the one or more disaggregated resources, and store the performance related data in the local counter.

In Example C2, the subject matter of Example C1 can optionally include where the received performance related data in the local counter is accessed using model specific registers.

In Example C3, the subject matter of any one of Examples C1-C2 can optionally include where the one or more disaggregated resources comprise a software defined infrastructure composite node.

In Example C4, the subject matter of any one of Examples C1-C3 can optionally include where the performance related data includes derived performance metrics. the derived performance metrics may have been created using a field programmable gate array In Example C5, the subject matter of any one of Examples C1-C4 can optionally include where the performance related data is based on data from a performance counter that is not native to a device that includes the local counter.

In Example C6, the subject matter of any one of Examples C1-C5 can optionally include where the request is to use the one or more disaggregated resources during execution of a process and the process accesses the performance related data in the local counter.

In Example C7, the subject matter of any one of Examples C1-C6 can optionally include where at least one of the one or more disaggregated resources is a virtual machine.

In Example A1, an apparatus that is part of a group that includes disaggregated resources, the apparatus can include memory, a collection engine, and at least one processor. The at least one processor is configured to cause the collection engine to receive a request for performance related data, where the request is received from a network manager, register with the network manager, collect performance related data, create derived performance metrics from the performance related data, and communicate the derived performance metrics to the network manager.

In Example, A2, the subject matter of Example A1 can optionally include where the performance related data is collected from a performance counter.

In Example A3, the subject matter of any one of Examples A1-A2 can optionally include where the performance related data was at least partially created using a local compute unit.

In Example A4, the subject matter of any one of Examples A1-A3 can optionally include where the compute unit is a field programable gate array.

In Example A5, the subject matter of any one of Examples A1-A4 can optionally include where the group of disaggregated resources comprise a software defined infrastructure composite node Example M1 is a method including receiving a request related to one or more disaggregated resources, linking the one or more disaggregated resources to a local counter, receiving performance related data from each of the one or more disaggregated resources, and storing the performance related data in the local counter.

In Example M2, the subject matter of Example M1 can optionally include where the local counter is a model specific register.

In Example M3, the subject matter of any one of the Examples M1-M2 can optionally include where the one or more disaggregated resources comprise a software defined infrastructure composite node.

In Example M4, the subject matter of any one of the Examples M1-M3 can optionally include where the performance related data includes derived performance metrics.

In Example M5, the subject matter of any one of the Examples M1-M4 can optionally include where at least one of the one or more disaggregated resources is a virtual machine.

In Example M6, the subject matter of any one of Examples M1-M5 can optionally include where the request is to use the one or more disaggregated resources during execution of a process and the process accesses the performance related data in the local counter.

Example S1 is a system for disaggregated resource monitoring, the system comprising memory, one or more processors, and a performance monitoring engine. The performance monitoring engine can be configured to receive a request related to one or more disaggregated resources, link the one or more disaggregated resources to a local counter, receive performance related data from the one or more disaggregated resources, and store the performance related data in the local counter.

In Example S2, the subject matter of Example S1 can optionally include where the local counter is a model specific register.

In Example S3, the subject matter of any one of the Examples S1-S2 can optionally include where the one or more disaggregated resources comprise a software defined infrastructure composite node.

In Example S4, the subject matter of any one of the Examples S1-S3 can optionally include where the performance related data includes derived performance metrics.

In Example S5, the subject matter of any one of the Examples S1-S4 can optionally include where the performance related data is based on data from a performance counter that is not native to a device that includes the local counter.

In Example S6, the subject matter of any one of the Examples S1-S5 can optionally include where the request is to use the one or more disaggregated resources during execution of a process and the process accesses the performance related data in the local counter.

In Example S7, the subject matter of any one of the Examples S1-S6 can optionally include where at least one of the one or more disaggregated resources is a virtual machine.

Example AA1 is an apparatus including means for receiving a request related to one or more disaggregated resources, means for associating the one or more disaggregated resources to a local counter, means for receiving performance related data from the one or more disaggregated resources, and means for storing the performance related data in the local counter.

In Example AA2, the subject matter of Example AA1 can optionally include where the received performance related data is accessed using model specific registers.

In Example AA3, the subject matter of any one of Examples AA1-AA2 can optionally include where the one or more disaggregated resources comprise a software defined infrastructure composite node.

In Example AA4, the subject matter of any one of Examples AA1-AA3 can optionally include where the performance related data includes derived performance metrics.

In Example AA5, the subject matter of any one of Examples AA1-AA4 can optionally include where the performance related data is based on data from a performance counter that is not native to a device that includes the local counter.

In Example AA6, the subject matter of any one of Examples AA1-AA5 can optionally include where the one or more disaggregated resources are related to a process and the process accesses the performance related data in the local counter.

In Example AA7, the subject matter of any one of Examples AA1-AA6 can optionally include where at least one of the one or more disaggregated resources is a virtual machine.

Example X1 is a machine-readable storage medium including machine-readable instructions to implement a method or realize an apparatus as in any one of the Examples A1-A4, AA1-AA7, or M1-M6. Example Y1 is an apparatus comprising means for performing of any of the Example methods M1-M6. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. At least one non-transitory machine readable medium comprising one or more instructions that, when executed by at least one processor, causes the at least one processor to:
   receive a request related to one or more disaggregated resources;
   link the one or more disaggregated resources to a local counter;
   receive performance related data from the one or more disaggregated resources, wherein the performance related data is not natively exposed to an initiator of the request; and
   store the performance related data in the local counter.

2. The at least one non-transitory machine readable medium of claim 1, wherein the one or more disaggregated resources comprise a software defined infrastructure composite node.

3. The at least one non-transitory machine readable medium of claim 1, wherein the performance related data includes derived performance metrics.

4. The at least one non-transitory machine readable medium of claim 3, wherein the derived performance metrics were created using a field programmable gate array.

5. The at least one non-transitory machine readable medium of claim 1, wherein the performance related data is based on data from a performance counter that is not native to a device that includes the local counter.

6. The at least one non-transitory machine readable medium of claim 1, wherein the request is to use the one or more disaggregated resources during execution of a process and the process accesses the performance related data in the local counter.

7. The at least one non-transitory machine readable medium of claim 1, wherein at least one of the one or more disaggregated resources is a virtual machine.

8. An apparatus that is part of a group that includes disaggregated resources, the apparatus comprising:
   memory;
   a collection engine; and
   at least one processor, wherein the at least one processor is configured to cause the collection engine to:
     receive a request for performance related data, wherein the request is received from a network manager;
     register with the network manager;
     collect the performance related data;
     create derived performance metrics from the performance related data; and
     communicate the derived performance metrics to the network manager, wherein the performance related data and/or the derived performance metrics are not natively exposed to a network element in communication with the network manager.

9. The apparatus of claim 8, wherein the performance related data is collected from a performance counter.

10. The apparatus of claim 8, wherein the derived performance metrics was at least partially created using a local compute unit.

11. The apparatus of claim 10, wherein the compute unit is a field programable gate array.

12. The apparatus of claim 8, wherein the group of disaggregated resources comprise a software defined infrastructure composite node.

13. A method comprising:
   receiving a request related to one or more disaggregated resources;
   linking the one or more disaggregated resources to a local counter;
   receiving performance related data from each of the one or more disaggregated resources, wherein the performance related data is not natively exposed to an initiator of the request; and
   storing the performance related data in the local counter.

14. The method of claim 13, wherein the local counter is a model specific register.

15. The method of claim 13, wherein the one or more disaggregated resources comprise a software defined infrastructure composite node.

16. The method of claim 13, wherein the performance related data includes performance metrics.

17. The method of claim 13, wherein at least one of the one or more disaggregated resources is a virtual machine.

18. The method of claim 13, wherein the request is to use the one or more disaggregated resources during execution of a process and the process accesses the performance related data in the local counter.

19. A system for disaggregated resource monitoring, the system comprising:
   memory;
   one or more processors; and
   a performance monitoring engine, wherein the performance monitoring engine is configured to:
      receive a request related to one or more disaggregated resources;
      link the one or more disaggregated resources to a local counter;
      receive performance related data from the one or more disaggregated resources, wherein the performance related data is not natively exposed to an initiator of the request; and
      store the performance related data in the local counter.

20. The system of claim 19, wherein the local counter is a model specific register.

21. The system of claim 19, wherein the one or more disaggregated resources comprise a software defined infrastructure composite node.

22. The system of claim 19, wherein the performance related data includes derived performance metrics.

23. The system of claim 19, wherein the performance related data is based on data from a performance counter that is not native to a device that includes the local counter.

24. The system of claim 19, wherein the request is to use the one or more disaggregated resources during execution of a process and the process accesses the performance related data in the local counter.

25. The system of claim 19, wherein at least one of the one or more disaggregated resources is a virtual machine.

* * * * *